United States Patent
Zhang et al.

(10) Patent No.: US 9,183,459 B1
(45) Date of Patent: Nov. 10, 2015

(54) SENSOR FUSION USING DETECTOR CONFIDENCE BOOSTING

(71) Applicant: THE BOEING COMPANY, Chicago, IL (US)

(72) Inventors: Zhiqi Zhang, Santa Clara, CA (US); Kyungnam Kim, Oak Park, CA (US); Jiejun Xu, Chino, CA (US); Yuri Owechko, Newbury Park, CA (US); Hai-Wen Chen, Aberdeen, MD (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/270,553

(22) Filed: May 6, 2014

(51) Int. Cl.
  *G06K 9/46* (2006.01)
  *G06K 9/52* (2006.01)
  *G06K 9/62* (2006.01)

(52) U.S. Cl.
  CPC *G06K 9/468* (2013.01); *G06K 9/46* (2013.01); *G06K 9/52* (2013.01); *G06K 9/6218* (2013.01); *G06K 9/6267* (2013.01); *G06K 2009/4666* (2013.01)

(58) Field of Classification Search
  CPC .............................. G06K 9/468; G06K 9/6267
  See application file for complete search history.

(56) References Cited

U.S. PATENT DOCUMENTS

| | | | |
|---|---|---|---|
| 2007/0171431 A1* | 7/2007 | Laflamme | 356/602 |
| 2008/0049975 A1* | 2/2008 | Stiegler | 382/104 |
| 2008/0294401 A1* | 11/2008 | Tsin et al. | 703/8 |
| 2010/0183192 A1* | 7/2010 | Fritsch et al. | 382/103 |
| 2010/0278008 A1* | 11/2010 | Ammar | 367/7 |
| 2010/0315505 A1* | 12/2010 | Michalke et al. | 348/118 |
| 2013/0142390 A1* | 6/2013 | Othmezouri et al. | 382/103 |

OTHER PUBLICATIONS

L. Bo, Lai, K.X. Ren and D. Fox; "Object Recognition With Hierarchical Kernel Descriptors, in Computer Vision and Pattern Recognition" Intelligent Robots and Systems (IROS), 2011 IEEE/RSJ International Conference on Sep. 25-30, 2011.

K. Lai, L. Bo, X. Ren and D. Fox; Detection-based Object Labeling in 3D Scenes. Robotics and Automation (ICRA), 2012 IEEE International Conference on May 14-18, 2012.

(Continued)

*Primary Examiner* — Samir Ahmed
(74) *Attorney, Agent, or Firm* — Joseph F. Harding; The Small Patent Law Group, LLC

(57) ABSTRACT

A method for detecting one or more target objects is provided including obtaining 2-dimensional imaging information and 3-dimensional point cloud information of a target zone. The method also includes determining a ground plane in the point cloud information and removing the ground plane to generate modified 3-dimensional information. Also, the method includes identifying a set of 2-dimensional candidate objects from the 2-dimensional imaging information, and identifying a set of 3-dimensional candidate objects from the modified 3-dimensional information. The method also includes determining, for each of at least some of the 2-dimensional candidate objects, a corresponding 3-dimensional candidate object from the set of 3-dimensional candidate objects. Further, the method includes modifying the 2-dimensional confidence measure for each of the at least some of the 2-dimensional candidate objects to generate fused confidence measures based on whether the 2-dimensional candidate object corresponds to a 3-dimensional candidate object.

20 Claims, 9 Drawing Sheets

(56) References Cited

OTHER PUBLICATIONS

L. Spinello, and K.O. Arras: "People Detection in RGB-D Data", Intelligent Robots and Systems (IROS), 2011 IEEE/RSJ International Conference on Sep. 25-30, 2011.

P.F. Felzenszwalb, R.B. Girshick, D. Mcallester, and D. Ra-mamman: "Object Detection with Discriminatively Trained Part Based Model" IEEE, Transactions on Pattern Analysis and Machine Intelligence, vol. 32, No. 9, Sep. 2010.

A. Geiger, P. Lenz, C. Stiller and R. Urtasun; "Vision Meets Robotics"; The KITTI Dataset: International Journal of Robotics Research, 2013 32: originally published online Aug. 23, 2013.

N. Dalal and B. Triggs; "Histograms of Oriented Gradients for Human Detection, In COmputer Vision and Pattern Recognition" Computer Vision and Pattern Recognition, 2005. CVPR 2005. IEEE Computer Society Conference on Jun. 25-25, 2005, vol. 1.

* cited by examiner

SENSOR FUSION USING DETECTOR CONFIDENCE BOOSTING

BACKGROUND

The present disclosure relates in general to object detection, and more particularly to methods and systems for object detection using 2-dimensional (2D) and 3-dimensional (3D) information.

Object detection, or object recognition, may be utilized in a variety of industries or applications, including defense or law enforcement, among others. For example, it may be desirable to identify one or more objects such as cars, pedestrians, buildings, or the like. Conventional object detection approaches may not provide desired reliability in accurately identifying target objects and/or may provide a greater than desired number of false positive identifications (e.g., detecting a non-target object as a target object).

SUMMARY

In one embodiment, a method for detecting one or more target objects is provided that includes obtaining 2-dimensional imaging information of a target zone. The method also includes obtaining 3-dimensional point cloud information of the target zone. Further, the method includes determining a ground plane in the 3-dimensional point cloud information and removing the ground plane to generate modified 3-dimensional information. Also, the method includes identifying a set of 2-dimensional candidate objects from the 2-dimensional imaging information, with each 2-dimensional candidate object having associated therewith a corresponding 2-dimensional confidence measure, and identifying a set of 3-dimensional candidate objects from the modified 3-dimensional information by clustering proximal points from the modified 3-dimensional information into object groups, with each 3-dimensional candidate object having associated therewith a corresponding 3-dimensional confidence measure. The method also includes determining, for each of at least some of the 2-dimensional candidate objects, a corresponding 3-dimensional candidate object from the set of 3-dimensional candidate objects. Further, the method includes modifying the 2-dimensional confidence measure for each of the at least some of the 2-dimensional candidate objects based on whether the 2-dimensional candidate object corresponds to a 3-dimensional candidate object, to generate fused confidence measures using the 2-dimensional confidence measures for each of the at least some of the 2-dimensional candidate objects and the 3-dimensional confidence measures of the determined corresponding 3-dimensional candidate objects. The fused confidence measure filters out false objects from the 2-dimensional candidate objects to identify with a high degree of confidence a set of target objects.

In another embodiment, a tangible and non-transitory computer readable medium is provided. The tangible and non-transitory computer readable medium includes one or more computer software modules including instructions therein configured to direct one or more processors to: obtain 2-dimensional imaging information of a target zone; obtain 3-dimensional point cloud information of the target zone; determine a ground plane in the 3-dimensional point cloud information and remove the ground plane to generate modified 3-dimensional information; identify a set of 2-dimensional candidate objects from the 2-dimensional imaging information, each 2-dimensional candidate object having associated therewith a corresponding 2-dimensional confidence measure; identify a set of 3-dimensional candidate objects from the modified 3-dimensional information by clustering proximal points from the point cloud information into object groups, each 3-dimensional candidate object having associated therewith a corresponding 3-dimensional confidence measure; determine, for each of at least some of the 2-dimensional candidate objects, a corresponding 3-dimensional candidate object from the set of 3-dimensional candidate objects; and modify the 2-dimensional confidence measure for each of the at least some of the 2-dimensional candidate objects based on whether the 2-dimensional candidate object corresponds to a 3-dimensional candidate object, to generate fused confidence measures using the 2-dimensional confidence measures for each of the at least some of the 2-dimensional candidate objects and the 3-dimensional confidence measures of the determined corresponding 3-dimensional candidate objects. The fused confidence measure filters out false objects from the 2-dimensional candidate objects to identify with a high degree of confidence a set of target objects.

In another embodiment, a system is provided that includes a first imaging device, a second imaging device, and a processing unit. The first imaging device is configured to acquire 2-dimensional imaging information of a target zone. The second imaging device is configured to acquire 3-dimensional point cloud information of the target zone. The processing unit is operably coupled to the first imaging device and the second imaging device. The processing unit includes software modules having instructions therein which, when executed by the processing unit, are configured to obtain the 2-dimensional imaging information and the 3-dimensional point cloud information, and to determine a ground plane in the 3-dimensional point cloud information and remove the ground plane to generate modified 3-dimensional information; identify a set of 2-dimensional candidate objects from the 2-dimensional imaging information, each 2-dimensional candidate object having associated therewith a corresponding 2-dimensional confidence measure; identify a set of 3-dimensional candidate objects from the modified 3-dimensional information by clustering proximal points from the modified 3-dimensional information into object groups, each 3-dimensional candidate object having associated therewith a corresponding 3-dimensional confidence measure; determine, for each of at least some of the 2-dimensional candidate objects, a corresponding 3-dimensional candidate object from the set of 3-dimensional candidate objects; and modify the 2-dimensional confidence measure for each of the at least some of the 2-dimensional candidate objects based on whether the 2-dimensional candidate object corresponds to a 3-dimensional candidate object, to generate fused confidence measures using the 2-dimensional confidence measures for each of the at least some of the 2-dimensional candidate objects and the 3-dimensional confidence measures of the determined corresponding 3-dimensional candidate objects. The fused confidence measure filters out false objects from the 2-dimensional candidate objects to identify with a high degree of confidence a set of target objects.

DETAILED DESCRIPTION

Figure 1:
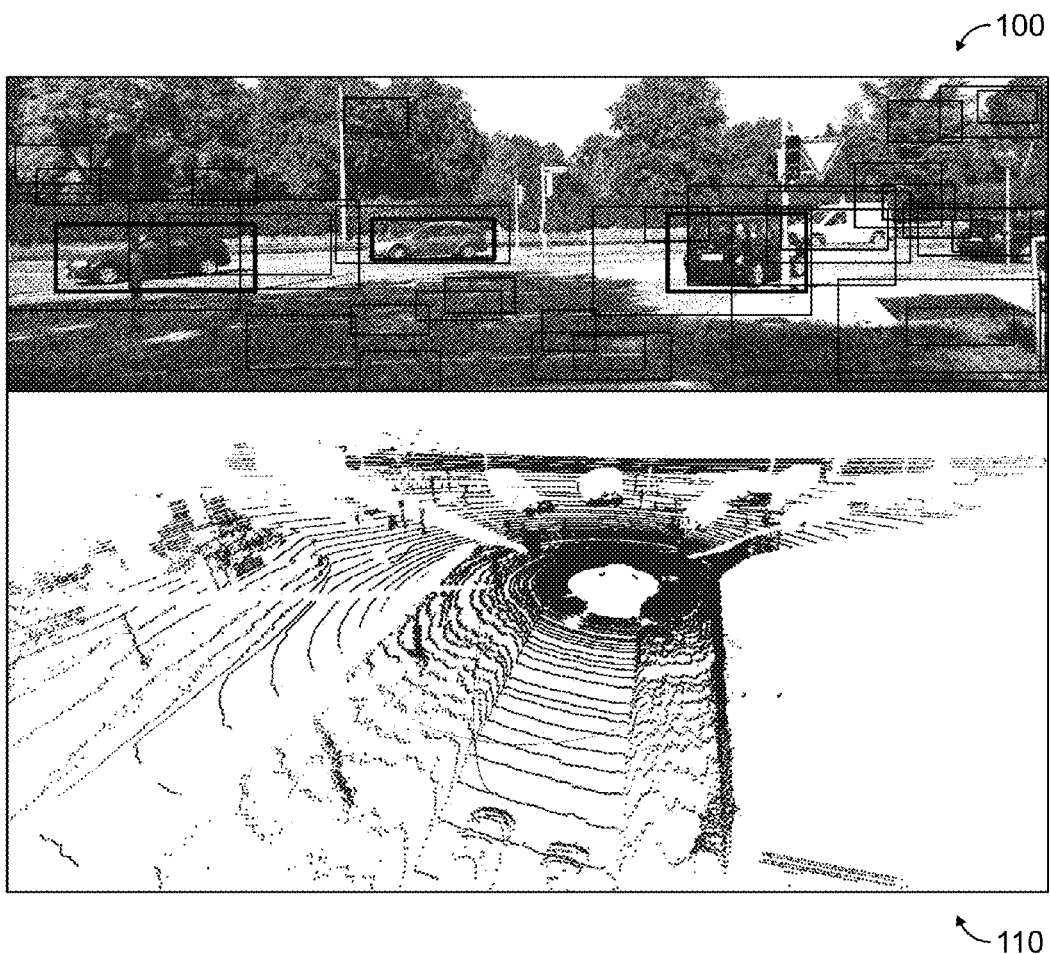
FIG. 1 is an illustration of 2D and 3D images in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks (e.g., lens or amplifier) may be implemented in a single piece of hardware (e.g., a simple lens or a single amplifier stage or chip) or multiple pieces of hardware. Similarly, the software programs may be stand-alone programs, may be incorporated as subroutines in an operating system, may be implemented in a field-programmable gate array, and the like. It should be understood that the various embodiments are not limited to the arrangements and instrumentality shown in the drawings.

As used herein, the terms "system," "unit," or "module" may include any combination of hardware and/or software system that operates to perform one or more functions. For example, a system, unit, or module may include a computer processor, controller, or other logic-based device that performs operations based on instructions stored on a tangible and non-transitory computer readable storage medium, such as a computer memory. Alternatively, a system, unit, or module may include a hard-wired device that performs operations based on hard-wired logic of the device. The systems, modules, or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide systems and methods for object detection. For example, in various embodiments (e.g., embodiments discussed in connection with FIGS. 1-12), methods and/or systems may be provided including one or more aspects discussed as follows:

A method and/or system for object (e.g., vehicles pedestrians) detection is provided using a combination of 2D and 3D sensor data). Detection on individual data modalities is carried out in parallel, and then combined using a fusion scheme to deliver final detection results. Specifically, a deformable part based object detection in the 2D image domain may be first applied to obtain initial estimates of candidate object regions. Meanwhile, 3D blobs (i.e., clusters of 3D points) containing potential objects are extracted from the corresponding input point cloud in an unsupervised manner. A novel morphological feature set is proposed to characterize each of these 3D blobs, and only blobs matched to predefined object models are kept. Based on the individual detections from the aligned 2D and 3D data, a fusion scheme is developed to boost object detection confidence. Experimental results with the proposed method are promising.

1. Introduction

In this disclosure, a sensor fusion method for enhanced object detection in outdoor urban environments is proposed. The input consists of a 2D image captured with an EO (electro-optical) sensor and a 3D point cloud captured by a Lidar sensor such as the Velodyne-64. (See FIG. 1 showing a 2D image 100 and a corresponding 3D point cloud 110). The sensors may be assumed to be pre-calibrated, and the 2D and 3D data are aligned. This means for each point of the 3D point cloud, there is a corresponding point within the 2D image based on a certain transformation. Given EO images with appearance information such as color, texture, and gradient information, and 3D point clouds with accurate depth (distance) information, one goal is to leverage both for improved object detection. Our method can be used for a variety of different ground objects such as pedestrians, cyclists, cars, trucks, or buses, but detection of car objects is discussed herein, as car objects are widely available in many public datasets.

Many 2D and 3D fusion methods have been proposed for the task of object detection in the past. Bo et al. (L. Bo, Lai, K., X. Ren, and D. Fox, Object Recognition with Hierarchical Kernel Descriptors, In Computer Vision and Pattern Recognition (CVPR), 2011) combined the 2D color, gradient and shape features with 3D size features, shape features, and edges features to achieve object detection. Lai et al. (K. Lai, L. Bo, X. Ren and D. Fox, Detection-based Object Labeling in 3D Scenes, Robotic and Automation (ICRA), 2012) and Spinello et al (L. Spinello, and K. O. Arras, People Detection in RGB-D Data, Intelligent Robots and Systems (IROS), 2011) fuse the Histograms of Oriented Gradients (HOG) features on 2D RGB images and HOG features on depth image to achieve object detection. Following their success, we combine a 2D object detector, Deformable Part Model (DPM) (see P. F. Felzenszwalb, R. B. Girshick, D Mcallester, and D. Ramanman, Object Detection with Discriminatively Trained Part Based Model, IEEE-TPAMI) detector, with our morphology-based 3D feature descriptor (MorpFt_166), which will be described later herein, to perform combined 2D/3D object detection.

There are three major processes in various embodiments: 1) Object detection within 2D images using DPM; 2) Object detection within the 3D point cloud using the MorpFt_166 features, and further evaluation of the 3D detections in conjunction with the 2D detections obtained in step 1; and 3) Fusion of the 2D and 3D detection results by combining the 2D and 3D confidence scores. (See FIG. 2.)

2. Process Overview

Figure 2:
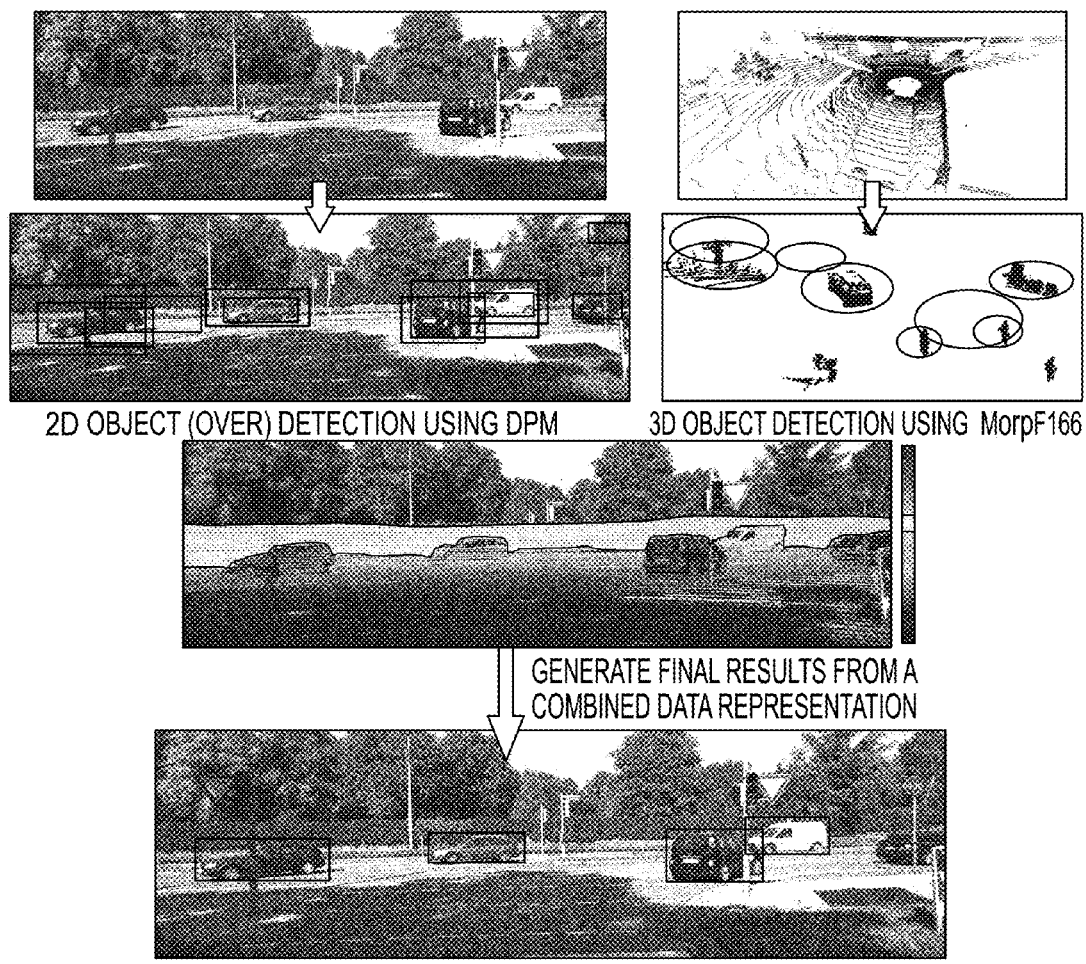
FIG. 2 provides an overview of object detection in accordance with an embodiment.

The overall detection process can be broken into three major steps as illustrated in FIG. 2: 1) Perform object over detection in EO image by using the DPM object detection method, as described in the following section. 2) Extract MorpFt_166 features form the 3D point clouds, and classify using a linear SVM kernel model trained using car data. 3) Re-evaluate the detection results by combining the 2D DPM detection scores and 3D MorpFt_166 model scores to generate the final detection results.

2.1 2D DPM Object Detection

Object detection with deformable part model (DPM) is one of the best object detection methods currently available. DPM assumes an object is constructed by its parts. Thus, the detector will first find a global match form the object (root filter matching), and then use its part models to fine-tune the result (part model matching). Therefore, in order to achieve object detection by using DPM, we have to train the root model as well as the part model. The model used in connection with various embodiments herein is pre-trained and provided from the KITTI vision benchmark suite. (See A. Geiger, P. Lenz, C. Stiller, and R. urtasun, Vision Meets Robotics: The KITTI Dataset, International Journal of Robotics Research (IJRR), 2013.)

For each image, over detection may be performed in order to obtain as many car candidates as possible. The false alarms generated by the over detection may be filtered out based on the 2D/3D fusion steps.

2.2 3D Object Detection by Using MorpFt_166 Features

In the 3D processing leg, blobs are extracted from the 3D point cloud by removing the ground plane and then clustering the points in an unsupervised manner. After blobs from the point cloud are extracted, the MorpFt-166 features from each blob are extracted. 3D blob models are created by training the MorpFt_166 features using linear kernel based SVM. These 3D blob models can be used to re-evaluate the 2D detection results, which will be discussed in detail in the following sections.

2.3 Object Detection by Fusing 2D and 3D Detection Results

After DPM 2D object detection, many candidate bounding boxes may have been obtained, and each candidate bounding box has a confidence score (named C_dpm). This confidence score represents how likely the candidate bounding box covers a desired object according to the 2D features. After the re-evaluation of each candidate bounding box by using the MorpFt_166 models, another confidence score (named C_morph) is obtained for each bounding box. In this fusion step, a method is introduced to efficiently combine these two scores to further improve the detection performance. The performance obtained by combining 2D and 3D confidence scores may be improved over either alone.

3. 2D DPM Object Detection

Figure 3:
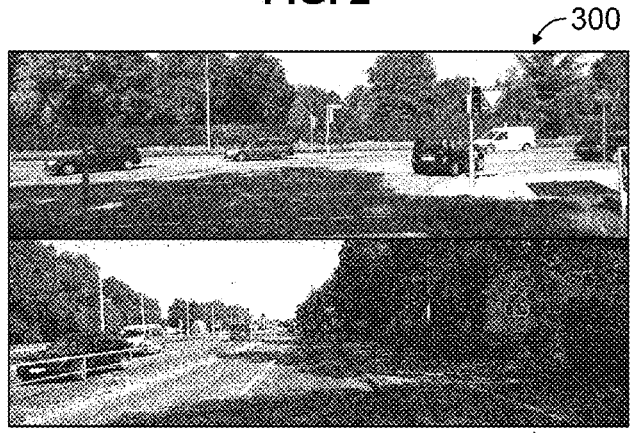
FIG. 3 illustrates sample frames from datasets in accordance with an embodiment.
Figure 4:
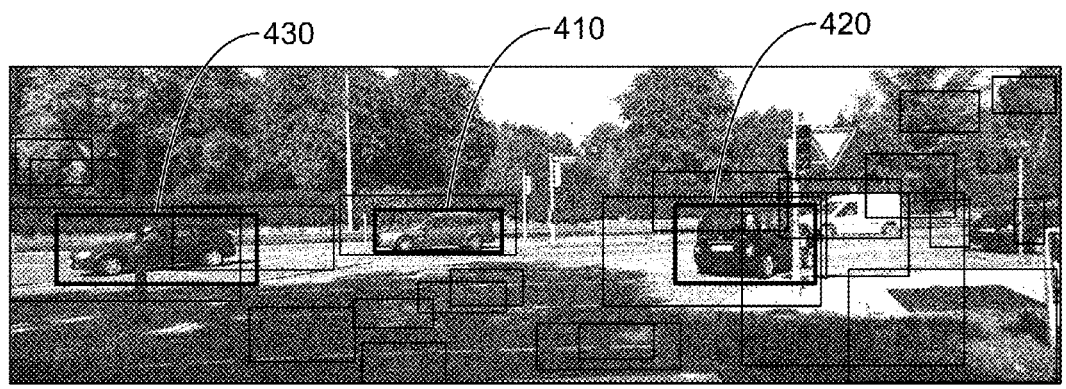
FIG. 4 depicts DPM object detection results in accordance with an embodiment.

As explained above, the pre-trained DPM model may be used to perform the "car" detection on the video sequence from the KITTI data set. FIG. 3 shows some sample frames 300, 310 from the video sequence. For each frame over detection is performed, which means many more 2D object detections boxes are kept than the number of expected objects. As shown in FIG. 4, the rectangular bounding boxes 410, 420, 430 are the 2D object detection boxes obtained from the DPM detection. The bounding box 410 is the detection box with the highest confidence score, the bounding box 420 is the second highest one, and the bounding box 430 has the third highest confidence score.

In order to compare the DPM only object detection performance with the 2D/3D fusion, we evaluated the 2D only DPM detection performance using a precision-recall curve. The principal quantitative measure used was the average precision (AP). Detections are considered true or false positives based on the area of overlap with ground truth bounding boxes. To be considered a correct detection, the area of overlap $a_o$ between the detected bounding box $B_d$ and ground truth bounding box $B_{gt}$ must exceed 50% by the formula:

$$a_0 = \frac{\text{area}(B_d \cap B_{gt})}{\text{area}(B_d \cup B_{gt})}$$

It is known that there are few 3D points on the faraway objects when the distance between the objects and the camera is out of the range of 3D sensors. Extracting 3D features from faraway objects will result in very noisy or no data. Therefore, the performance was evaluated by just considering objects within 25 meters. As explained in the Introduction section, each 2D image from the KITTI data corresponds to a registered point cloud as illustrated in FIG. 1. Therefore, it is straightforward to calculate the distance from the object to the camera using following method: 1) For each of the 2D points inside the 2D detecting bounding box, find the corresponding 3D points from the synchronized point clouds. 2) Calculate the distance of each 3D point $(D(p_i))$ to the camera by $D(P_i) = \text{sqrt}(x^2+y^2+z^2)$. 3) Set the distance of the detected object by average distance:

$$\overline{D} = \frac{1}{n} \sum_{i=1}^{n} D(P_i)$$

Figure 5:
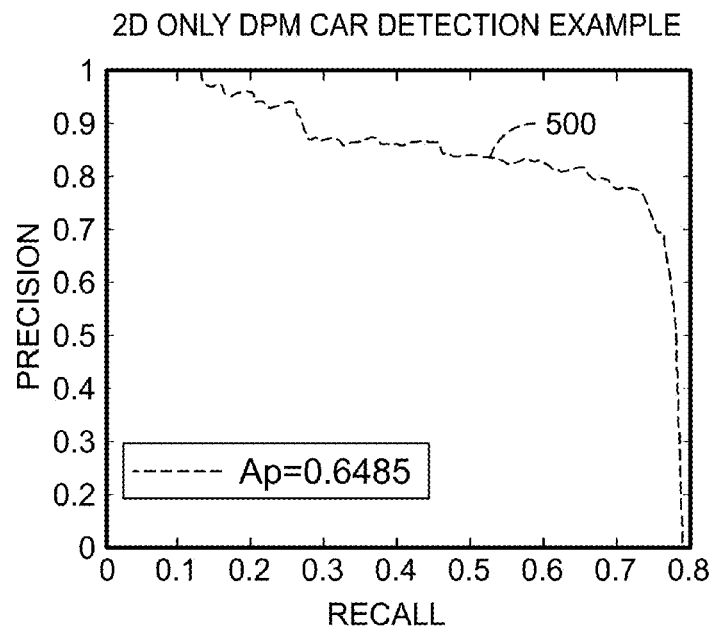
FIG. 5 is a precision recall curve of 2D DPM car detection.

After the distance is obtained, the detected object beyond 25 meters may be ignored. The resulting precision recall curve 500 is shown in FIG. 5.

4. 3D Object Detection and Classification

Figure 6:
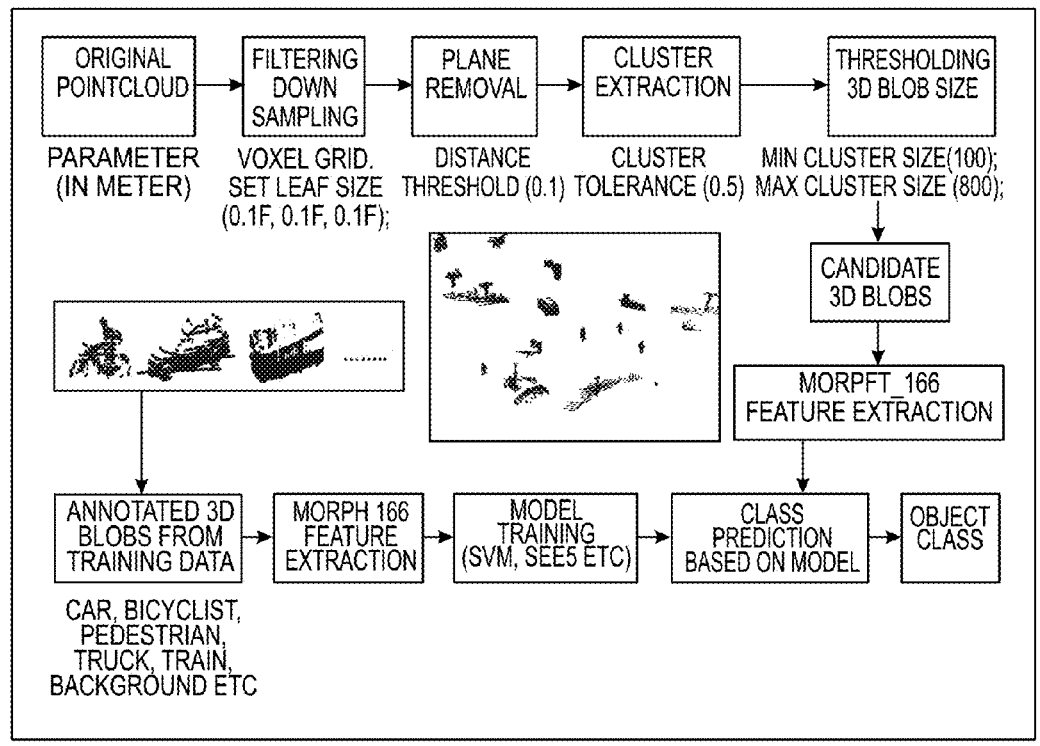
FIG. 6 is a block diagram of a 3D processing pipeline in accordance with an embodiment.

Given a 3D point cloud acquired by LIDAR as input, the 3D detection and classification module starts with reducing the number of points in the cloud via voxel grid down-sampling to yield a more compact capture of the scene. The ground plane is then estimated and potential objects above ground are extracted/segmented automatically based on unsupervised clustering. These object candidates are then processed and morphology-based features are extracted. Subsequently, these blobs are classified into a set of pre-defined classes. FIG. 6 shows the overall steps in the 3D processing system.

4.1 Ground Plane Estimation

The first step of an example 3D processing pipeline is to downsample the input point cloud. The main purpose of this step is to reduce the number of points in the cloud in exchange for more efficient computation without losing recognition accuracy. A typical approach to downsample point cloud is the voxelized grid approach. (The VoxelGrid and other functionalities in the Point Cloud Library (PCL) were used for 3D processing.)

Once the point cloud is downsampled, the ground surface, where other object entities (e.g., buildings, cars, pedestrians) reside on, may be identified and removed. This is essentially fitting a plane model to the point cloud and finding the one with the maximum number of points. To speed up the search process, the Random Sample Consensus (RANSAC) algorithm is used to generate model hypotheses. The plan removal algorithm involves the following steps: 1) Randomly select three non-collinear unique points from the point cloud P; 2) Compute the plane model coefficients from the three points using the equation ax+by +cz+d=0; Compute the distances from all points belonging to the cloud P to the plane model (a, b, c, d); and 4) Count the number of points p* that belong to P whose distance to the plane model falls between a predefined threshold.

The fourth step represents a specific "scoring" model. Every set of points p* is stored, and the above steps are repeated for a number of iterations. After the algorithm is terminated, the set with the largest number of points (inliers) is selected as the support for the best planar model found. These points can be removed from the original point cloud before the next step in the pipeline.

4.2 3D Candidate Blob Detection

Given the point cloud above ground, clustering is used to divide the cloud into smaller parts in order to generate candidate object blobs for recognition. Most of the simpler clustering methods rely on spatial decomposition techniques that find subdivisions and boundaries to allow the data to be grouped together based on a measure of "proximity." This measure is usually represented as a Minkowski norm, with the most popular instantiations being the Manhattan (L1) and Euclidean (l2) distance metrics.

To achieve the clustering goal, the system needs to understand what an object point cluster is and what differentiates it from another point cluster. A cluster can be defined as follows:

Let $O_i=\{p_i \epsilon P\}$ be a distinct point cluster from $O_j=\{p_j \epsilon P\}$ if $\min\|p_i-p_j\|_2 > d_{th}$, where $d_{th}$ is a maximum imposed distance threshold. The above equation states that if the minimum distance between a set of points $p_i$ and another set $p_j$ is larger than a given distance value, then the points in $p_i$ are set to belong to one point cluster and the ones in $p_j$ to another distinct point cluster. From an implementation point of view, it is important to have notion of how this minimal distance between the two sets can be estimated. A solution is to make use of approximate nearest-neighbors queries via kd-tree representations. This allows for fast generation of clusters in an unsupervised manner.

Figure 7:
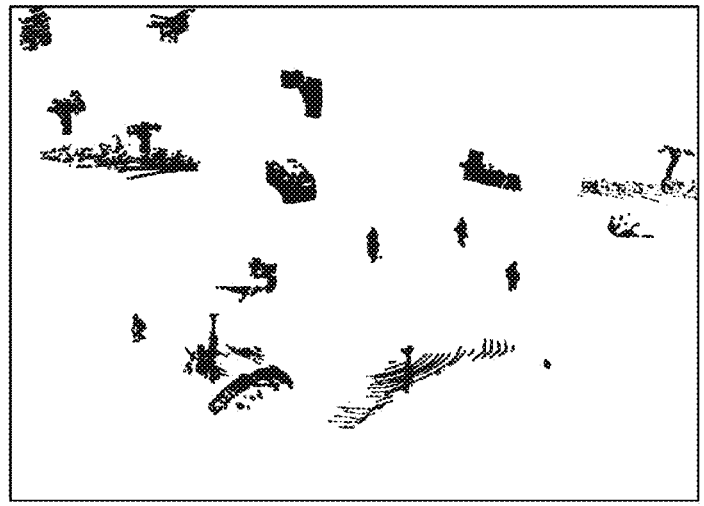
FIG. 7 is an illustration of example 3D blobs obtained with a clustering-based approach to a point cloud without a ground plane in accordance with an embodiment.

After initial clusters are extracted, an additional filtering step is performed to remove overly small/large 3D clusters. The ones which survive the filtering step are considered 3D candidate object blobs, and are passed to the next step in the pipeline for feature extraction and classification. FIG. 7 shows the candidate 3D blobs generated after the clustering and filtering step.

4.3 3D Blob Classification

It is challenging to extract robust features from a 3D object for recognition. The main reason is that the point cloud data are irregularly scattered in the 3D space, as opposed to the regularly and uniformly sampled 2D images. The point density is also reduced for objects further from the sensor. MorpFt_166 features which are described below may be used to characterize each 3D blob. The basic idea is to project the 3D blob into multiple horizontal 2D image slices at various heights. The 2D slices contain all the 3D shape information of the object if slices are sampled with close enough spacing (similar to CT/MRI scanned slices). The 2D image slices are regularly spaced images, and thus all the available image processing techniques can be applied to process these image slices, such as spatial filtering, view-invariant feature extraction, and other operations. Furthermore, the 2D image resolution is adaptively selected depending on the 3D point cloud density to avoid forming ill-conditioned images where the point cloud data are very sparse. In general, an adaptive sampling scheme may allow one to deal with point cloud data with as few as 50-100 points per object. In some embodiments, each 3D blob is decomposed into six slices, and seven morphological features along with other moment invariant features are extracted from each slice, resulting in a 166 dimensional feature vector.

Several morphologic features are extracted from the pixel patches in each slice:

1. Pixel number: the actual number of pixels in the slice.
2. Bounding box: the smallest rectangle containing the pixel region in the slice.
3. Centroid: the center of mass of the pixel region.
4. Major-Axis-Length: a scalar specifying the length (in pixels) of the major axis of the ellipse that has the same normalized second central moments as the pixel region.
5. Minor-Axis-Length: a scalar specifying the length (in pixels) of the minor axis of the ellipse that has the same normalized second central moments as the pixel region.
6. Orientation: the angle (in degrees ranging from −90 to 90 degrees) between the x-axis and the major axis of the ellipse that has the same second-moments as the pixel region.
7. Eccentricity: specifies the eccentricity of the ellipse that has the same second-moments as the pixel region.
8. Extent: specifies the ratio of pixels in the region to pixels in the total bounding box.

Given the computed feature vector associated with each 3D blob, a standard supervised learning paradigm is adapted in various embodiments for 3D object classification. For each class of object (e.g., pedestrians, cars, etc.), a SVM model is trained in a one-against-all fashion. When a new 3D candidate blob is generated, it is fed to the models trained for different classes. The one model giving the highest confidence score will be identified, and the 3D blob will be classified as the corresponding class.

5. 2D/3D Fusion for Object Detection

Figure 8:
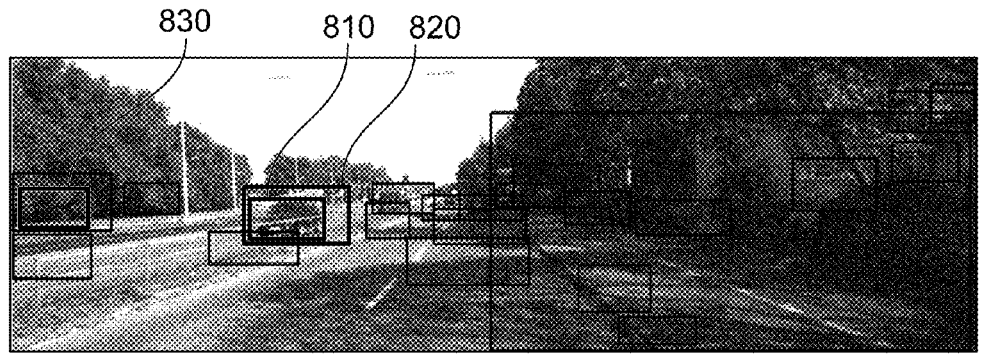
FIG. 8 is an illustration of 2D over detection results in accordance with an embodiment.
Figure 9:
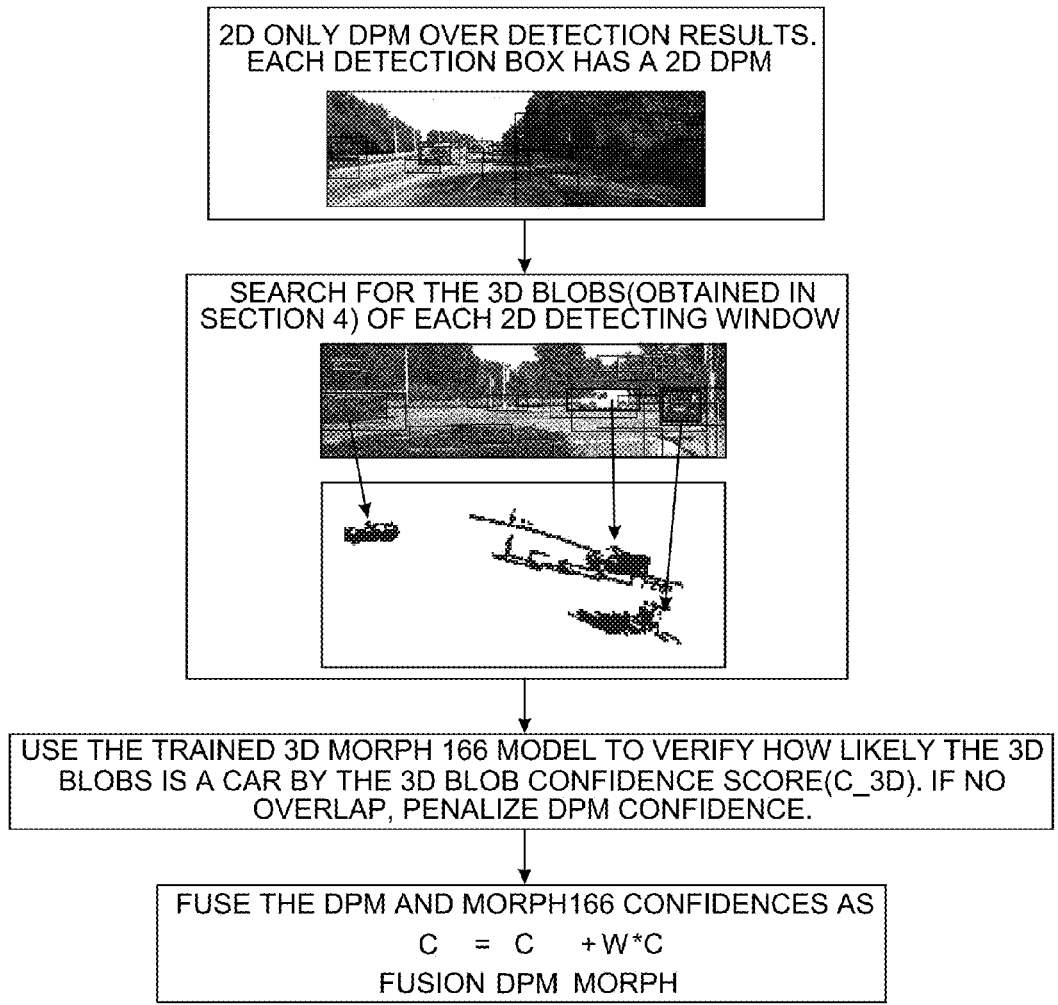
FIG. 9 illustrates a 2D/3D fusion process in accordance with an embodiment.

How the separate 2D and 3D object detection and classification work in various embodiments was explained in the above sections. However, combining 2D and 3D features is very important for achieving robust object detections. As shown in FIG. 8, a detection box 830 is detected with the third highest score by the 2D DPM object detector. (The box 810 has the highest score, and the box 820 has the second highest score.) However, if we consider the 3D feature information, the detection box 830 may be rejected as an incorrect detection result. Therefore, a method to fuse 2D and 3D features may be utilized in an example object detection system. The overall 2D/3D fusion steps are illustrated in FIG. 9.

Generally, 2D/3D fusion steps of various embodiments are listed as follows:

Step 1: For each of the 2D DPM detection boxes, search for the corresponding 3D blob from the blobs that are extracted using the method of Section 4.

Step 2: Extract the Morp_Ft166 features as explained in Section 4.

Step 3: Use the trained 3D blob model discussed in Section 4 to evaluate how likely the 3d blob is a "car." After this classification, a MorpFt_166 confidence score Cmorph is obtained. If there is no blob inside the 2D detection box, the DPM confidence is penalized.

Step 4: Fuse the DPM and MorpFt_166 confidences using $C_{fusion}=C_{DPM}+W*C_{morph}$, where W is a fixed parameter that was set at 0.55, which was found optimal for a known dataset and confidence scores obtained using MorpFt_166.

5.1 Search for the Correspondent 3D Blobs of Each 2D Detection Box

Figure 10:
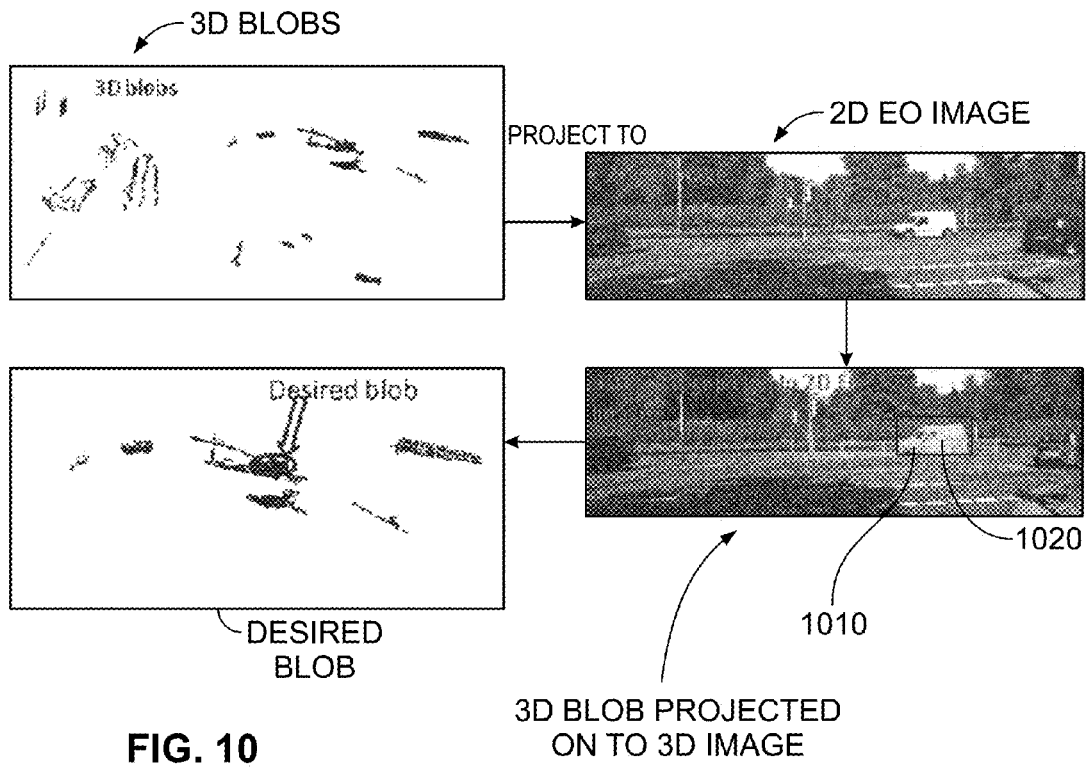
FIG. 10 illustrates determination of correspondence between a 3D blob and a 2D bounding box in accordance with an embodiment.

As discussed herein, the data from the Kitti data set contains 2D EO image as well as the synchronized 3D point cloud. In order to obtain the corresponding 3D blobs inside each 3D detection box, all blobs extracted may be first projected in the corresponding 2D images. As shown in FIG. 10, for each detection bounding box, all the blobs that can be projected to the 2D image may be searched to find the maximal overlap between the 2D rectangular bounding box and the projected blob. The blob projection that has the maximal overlap with the rectangular bounding box is the desired 3D blob. The equation below may be used to calculate the overlap between the rectangular bounding box and blob projection where $R_{rect}$ is the area of the rectangular bounding box (the rectangular bounding box 1010, and $R_{blob\_projection}$ is the area of the blob projection (the projection area 1020 in FIG. 10). As illustrated, the blob projection 1020 has the maximal overlap with the detection box 1010, therefore, the blob that corresponds to the blob projection 1020 is the desired blob.

$$\text{overlap} = \frac{R_{rect} \cap R_{blob_{projection}}}{R_{rect} \cup R_{blob_{projection}}}$$

In the above equation, if the overlap is less than 10%, it may be understood there is no overlapped blob of that 2D detection bounding box. If there is no 3D blob found within the detection bounding box, the 2D DPM confidence score may be penalized, as discussed in Section 5.3 herein.

5.2. Re-Evaluate the 2D Over Detection Bounding Box by 3D Blob Model

Figure 11:
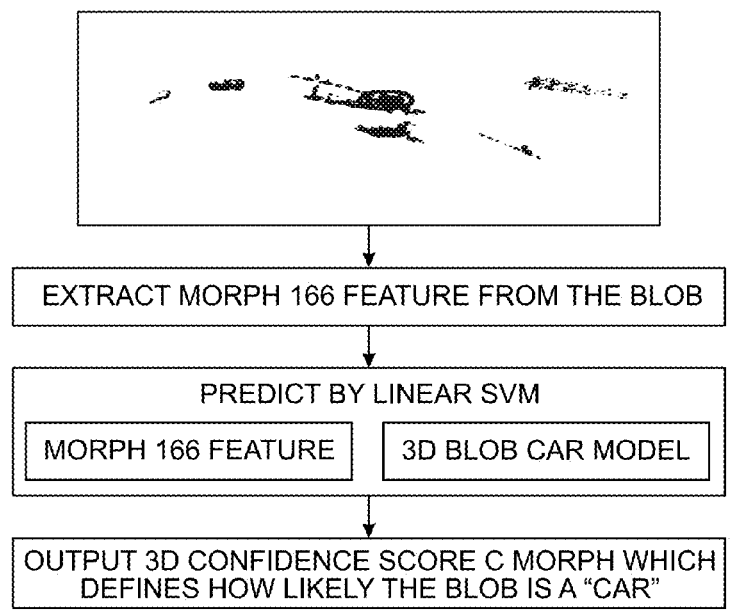
FIG. 11 is an illustration showing an evaluation of 2D detection results using 3D blob models in accordance with an embodiment.

In this step, a linear kernel Support Vector Machine (SVM) trained 3D blob model may be used to predict how likely the 3D blob is a "car." The re-evaluation process is illustrated in FIG. 11.

Step 1: Extract MorpFt_166 features from the blob as explained in Section 4.

Step 2: Use the linear SVM to predict the likelihood of the considered blob being a "car."

The output 3D confidence score $C_{morph}$ will be combined with the corresponding 2D DPM confidence score $C_{DPM}$ to generate the final fusion confidence score $C_{fusion}$.

5.3. 2D/3D Fusion

As discussed previously, if the 2D and 3D feature information may be combined together to perform object detection, the performance of object detection may be boosted. In this subsection, the fusion of a 2D DPM confidence score $C_{DPM}$ and 3D blob confidence score $C_{morph}$ to generate a fused confidence score $C_{fusion}$ are discussed in detail. For each 2D DPM over detection bounding box: Step 1—Check if there is a corresponding 3D blob according to the criteria discussed in Section 5.1. Step 2—If a corresponding 3D blob exists, set the new fusion score as $C_{fusion}=C_{DPM}+w*C_{morph}$, where w=0.55; If not, penalize the 2D DPM bounding box as: $C_{fusion}=C_{DPM}-\alpha$, where $\alpha=0.4$.

Note the parameters w and a are picked according to experiments. From observation and experiments, the 2D DPM detection performance was found more reliable compared to the 3D blob detection performance, which can be observed from the PR curve and AP scored shown in FIG. 12. So in the fusion score, the 2D DPM score CDPM is given a high weight. It was found that true positive detection bounding box usually encloses a 3D blob from experimental observation, therefore, the 2D DPM bounding box is penalized as: $C_{fusion}=C_{DPM}-\alpha$, where parameter $\alpha$ is picked according to experiments.

5.4 Fusion Results

Figure 12:
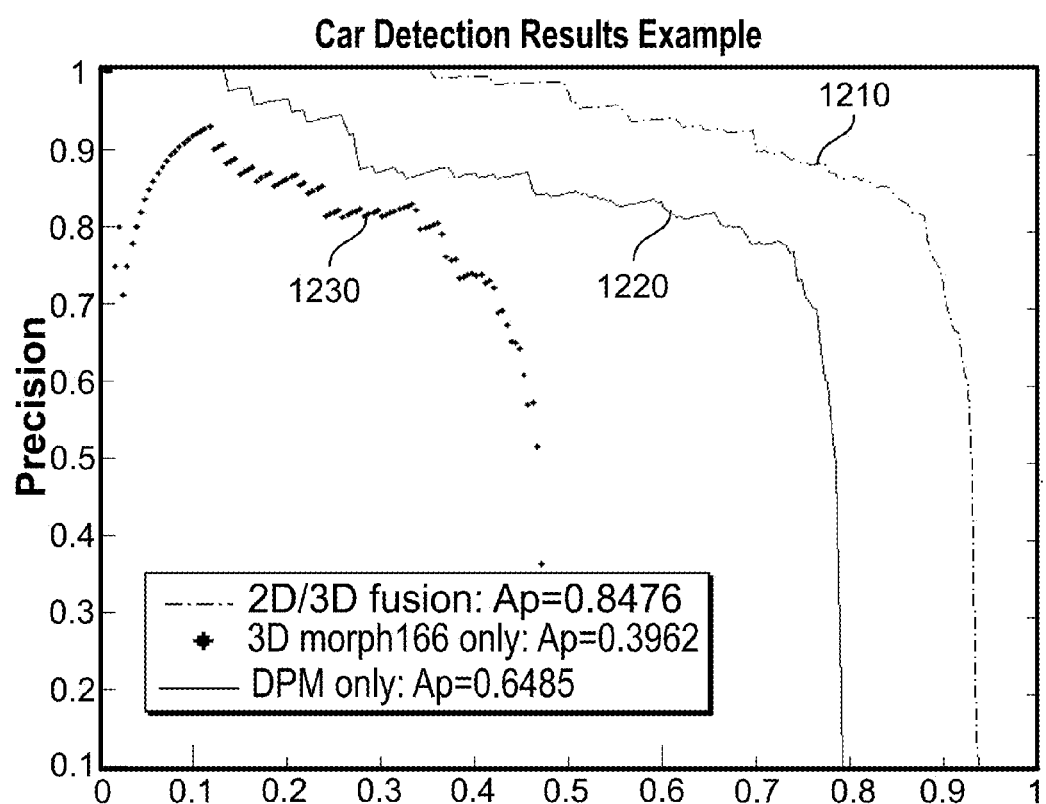
FIG. 12 is an illustration of precision recall curves in accordance with an embodiment.

FIG. 12 shows the Precision-Recall curve of the fusion results 1210.

In order to show the improvement of the fusion method, the PR curve 1220 of 2D only DPM detection results as well as the 3D blob only detection results 1230 are shown. It is clearly shown that the fusion method outperforms the 2D only DPM recognition and 3D only blob recognition.

With the above principles in mind, various embodiments are now discussed in connection with FIGS. 13-14. It may be noted that one or more aspects discussed in connection with FIGS. 1-12 may be utilized in conjunction with embodiments discussed in connection with FIGS. 13-14.

Figure 13:
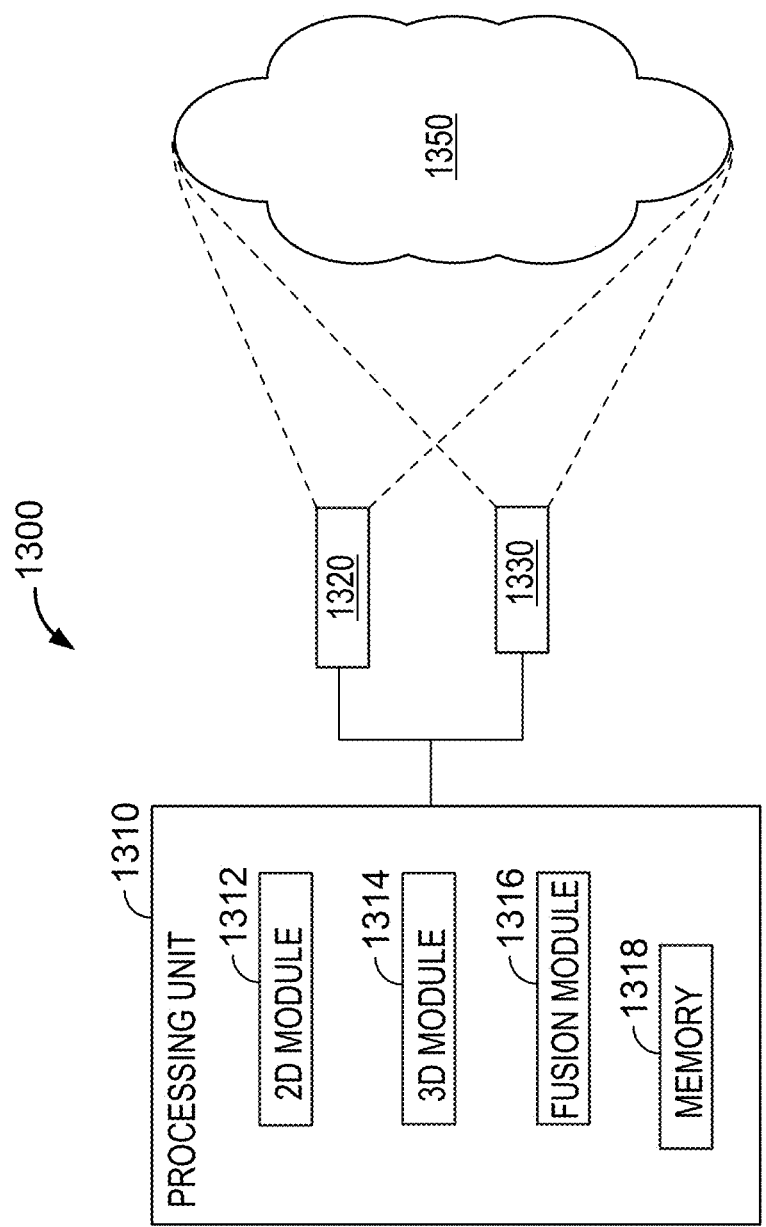
FIG. 13 is a schematic illustration of a detection system in accordance with an embodiment.

FIG. 13 provides a schematic illustration of a system 1300 (e.g., an object detection system) formed in accordance with various embodiments. The system 1300 is configured to detect the presence and/or location of objects within a target zone 1350. The objects may be objects distributed along a ground plane. (It may be noted that a ground plane, as used herein, need not necessarily be flat or planar, but may include elevation changes.) The objects, for example, may be cars, pedestrians, or buildings, among others.

The system 1300 includes a processing unit 1310, a first imaging device 820, and a second imaging device. Generally, the first imaging device 1310 collects 2D data of the imaging zone 1350, and the second imaging device 1330 collects 3D data of the imaging zone 1350. The processing unit 1310 obtains the 2D data from the first imaging device 1310 and the 3D data from the second imaging device 1330, and uses the 2D data and the 3D data to identify objects. The depicted processing unit 1310 generates a fused confidence score based on a first confidence score for the 2D data and a second confidence score for the 3D data to identify target objects with a high degree of confidence.

As mentioned herein, the first imaging device 1320 is configured to acquire 2D imaging information of the target zone 1350. The first imaging device 1320 may be a camera, for example an EO device, in various embodiments.

The second imaging device 1330 is configured to acquire 3D information of the target zone 1350. For example, the second imaging device 1330 may be configured as a lidar device and acquire 3D point cloud information of the target zone 1350.

The imaging devices may be configured to obtain video images and/or snap shots of the target zone 1350. It may be noted that the first imaging device 1320 and the second imaging device 1330 may be registered to each other so that imaging information from each device may be correlated to each other, with an object imaged in a frame by one of the devices also imaged in a corresponding and identifiable location of a frame of the other device. The registration may be mechanical. For example, the first imaging device 1320 and the second imaging device 1330 may be mounted to a common base or structure, and calibrated such that each device has a similar or corresponding field of view. The base or structure may be stationary (e.g., mounted to a stationary pole or other structure) or mobile (e.g., mounted to a car or other vehicle). Additionally or alternatively, images from the imaging devices may be registered to each other, for example, based on a recognizable or identifiable landmark within a field of view of images provided by the respective imaging devices. Further, in various embodiments, the imaging information provided from each imaging device may be time-stamped, with the processing unit 1310 utilizing imaging information from each imaging device from the same or similar time.

The processing unit 1310 is operably coupled to the first imaging device 1320 and the second imaging device 1330. The processing unit 1310 is configured to obtain the 2D information from the first imaging device 1320, to obtain the 3D information from the second imaging device 1330, and to identify objects within the target zone 1350 based on the 2D information and the 3D information. The depicted processing unit 1310 is configured to determine confidence measures for the 2D information and the 3D information, to generate a fused confidence measure using the 2D confidence measure and the 3D confidence measure, and to identify objects within the target zone 1350 based on the fused confidence measure. Generally, the processing unit 150 may include processing circuitry configured to perform one or more tasks or operations discussed herein (e.g., as discussed in connection with FIGS. 1-12 and/or in connection with FIGS. 13-14). In the illustrated embodiment, the processing unit 1310 includes a 2D module 1312, a 3D module 1314, a fusion module 1316, and a memory 1318. It may be noted that the depicted modules are provided by way of example only. Other module arrangements may be employed in various embodiments.

The depicted 2D module 1312 obtains 2D information (either directly or indirectly) from the first imaging device 1320, and identifies a set of 2D candidate objects from the 2D information obtained from the first imaging device. For example, using a DPM technique, the 2D module 1312 may identify bounding boxes corresponding to candidate targets. Further, the 2D module 1312 in the illustrated embodiment assigns a 2D confidence measure to each identified candidate target (e.g., bounding box). The confidence measure represents a measure of the likelihood that the candidate target represents an object desired to be detected (e.g., car). The candidate targets, as well as confidence measures, may be identified, for example, using an analytical model that has been trained using known or calibrated imaging data sets having known targets at known locations within the imaging data sets. For example, KITTI data may be used to train a model employed by the 2D module 1312. Objects not satisfying a threshold confidence measure may be discarded or not identified as candidate objects. It may be noted that, in some embodiments, only candidate objects within a predetermined range of the first imaging device 1320 (e.g., a range corresponding to an effective range of the second imaging device 1330) may be identified or retained, for example to avoid retaining 2D candidate objects for which reliable 3D information is not available.

It may be noted that, in various embodiments, the 2D module 1312 (and/or fusion module 1316, e.g., operating in conjunction with the 2D module 1312) may over detect, or identify or retain more candidate objects than would be conventionally identified or retained using an object detection scheme utilizing only 2D information, or only one set of imaging information. For example, over detection may include identifying or retaining a number of objects as 2D candidate objects that is greater than a number of expected objects in the target zone 1350 or within the field of view of the first imaging device 1320. For example, in some embodiments, twice as many candidate objects as expected objects may be identified and/or retained. As another example, five times as many candidate object as expected objects may be identified and/or retained. As one more example, ten times as many candidate objects as expected objects may be identified and/or retained. Additionally or alternatively, a threshold confidence measure for candidate object identification may be employed as part of over detection. For example, in various embodiments, 2D candidate objects may be identified or retained that have a confidence measure less than 50%, less than 20%, or less than 10%, among others. In some embodiments, all initially identified 2D candidate objects, regardless of confidence measure, may be retained as part of over detection. Over detection, or retention of 2D candidate objects having a lower confidence measure than conventionally retained, may be employed in various embodiments without increasing or substantially increasing a number of false positives of object detection or identification, as the 3D information may be used in conjunction with the over detected 2D candidate objects to discard false positives, while helping to insure that no true or actual objects (e.g., cars) are missed and/or reducing the number of missed true or actual objects detected. The ratio or amount of over detection may be varied in different embodiments, for example, depending on available processing capability and/or detection objectives (e.g., a relatively higher amount of over detection if it is relatively more important not to miss any objects, or a relatively lower amount of over detection if it is more acceptable to miss objects and/or if false positives are relatively more problematic).

In the illustrated embodiment, the 3D module 1314 obtains 3D information (either directly or indirectly) from the second imaging device 1330, and identifies a set of 3D candidate objects from the 3D information obtained from the second imaging device 1330. For example, the 3D information may include point cloud information. The 3D module 1314 may determine a ground plane (e.g., as discussed herein) in the 3D information (e.g., in the point cloud), and remove the ground plane to provide modified 3D information. The 3D candidate objects (e.g., blobs) may be identified using the modified 3D information. For example, the 3D module 1314 may cluster (e.g., in an unsupervised manner) proximal points from the modified 3D information into object groups to identify 3D candidate objects. The 3D candidate objects may be identified, for example, based on morphological features of the identified clusters. Further, the 3D module 1314 in the illustrated embodiment assigns a 3D confidence measure to each identified candidate target (e.g., cluster or blob). The confidence measure represents a measure of the likelihood that the candidate target represents an object desired to be detected (e.g., car). The candidate targets, as well as confidence measures, may be identified, for example, using an analytical model that has been trained using known or calibrated imaging data sets having known targets at known locations within the imaging data sets. It may be noted that, when identifying 3D candidate objects, overly large and/or overly small clusters may be removed or filtered from an initial set of identified clusters to provide a final set of 3D candidate objects.

The depicted fusion module 1316 identifies, for each of least some of the 2D candidate objects obtained from the 2D module 1312, a corresponding 3D candidate from the set of 3D candidates provided by the 3D module 1314, and modifies the 2D confidence scores with the 3D confidence scores to provide a corresponding fused confidence score for each 2D candidate object. The fused confidence scores may be used to determine or identify which candidate objects are detected or identified as objects to be detected (e.g., cars). The fused confidence measure filters out false objects or false positives from the 2D candidate objects to help identify a set of target objects with a high degree of confidence. Generally, the over detection of 2D candidate objects may help insure that no true objects are missed, while the 3D information may be used to filter out false positives from the over detected 2D candidate objects. The fusion module 1316 may be understood, in some embodiments, as using the 3D information to confirm or reject over detected 2D candidate objects.

In various embodiments, the fusion module 1316 identifies overlapping objects (e.g., 2D bounding boxes that overlap with blobs from 3D imaging information) and determines a fused confidence measure based on the overlap. The fusion module 1316 may modify a 2D confidence measure to generate a fused confidence measure based on whether a given 2D candidate object corresponds to a 3D candidate object. For example, the fusion module 1316 may determine if, for a given 2D candidate object, there is a corresponding 3D candidate object (e.g., based on satisfying a threshold amount of overlap of a 2D projection of the 3D candidate object with the 2D candidate object). If the fusion module 1316 identifies a candidate object (e.g., blob) from the 3D information that corresponds with a 2D candidate object (e.g., bounding box), the fusion module 1316 may use an equation or relationship using the 2D confidence measure of the 2D candidate object and the 3D confidence measure of the corresponding 3D candidate object as inputs to provide a fused confidence measure. For example, an equation of the form $C_{fusion} = C_{DPM} + W*C_{morph}$, where W is a fixed parameter, may be employed. W may be less than 1 (e.g., to weight the 2D confidence measure higher relative to the 3D confidence measure, where the 2D information is understood as more accurate and/or more reliable). The value of W may be experimentally determined based on equipment, detection objectives, or the like. In some embodiments, W may be set at about 0.55. If there is no corresponding 3D candidate object for a given 2D candidate object (e.g., no projected blob or other 3D candidate object satisfies a minimum overlap threshold, such as 10%, with the 2D candidate object), the 2D confidence measure may be decremented or otherwise penalized to generate a fused confidence measure. For example, where no corresponding 3D object is identified, the 2D confidence measure for a 2D candidate object may be modified by the relationship $C_{fusion} = C_{DPM} - \alpha$, where the parameter $\alpha$ is experimentally determined. For example, in some embodiments a is set at about 0.4. It may be noted that the particular relationships and parameter values discussed herein are provided by way of example, and that other forms of relationships and/or other parameter values may be employed in various embodiments. Using the fused confidence measure for the identified candidate objects, the fusion module 1316 (or other aspect of the processing unit 1310) may in some embodiments identify a subset of the candidate objects as detected objects. For example, the detected objects may be selected to correspond to an expected number of objects (for instance, either to have the same number of detected objects as expected objects, or to be within a range of an expected number of objects), with the candidate objects having the highest fused confidence measures selected as detected objects. As another example, the detected objects may be selected based on a threshold value of fused confidence measure (e.g., candidate objects having a fused confidence measure at or above the threshold identified as detected objects, and candidate objects having a fused confidence measure below the threshold not identified as detected objects). The particular threshold may be selected based on a desired detection objective (e.g., a lower threshold employed where recall is relatively more desired, and a higher threshold employed where precision (or elimination of false positives) is relatively more desired).

Figure 14:
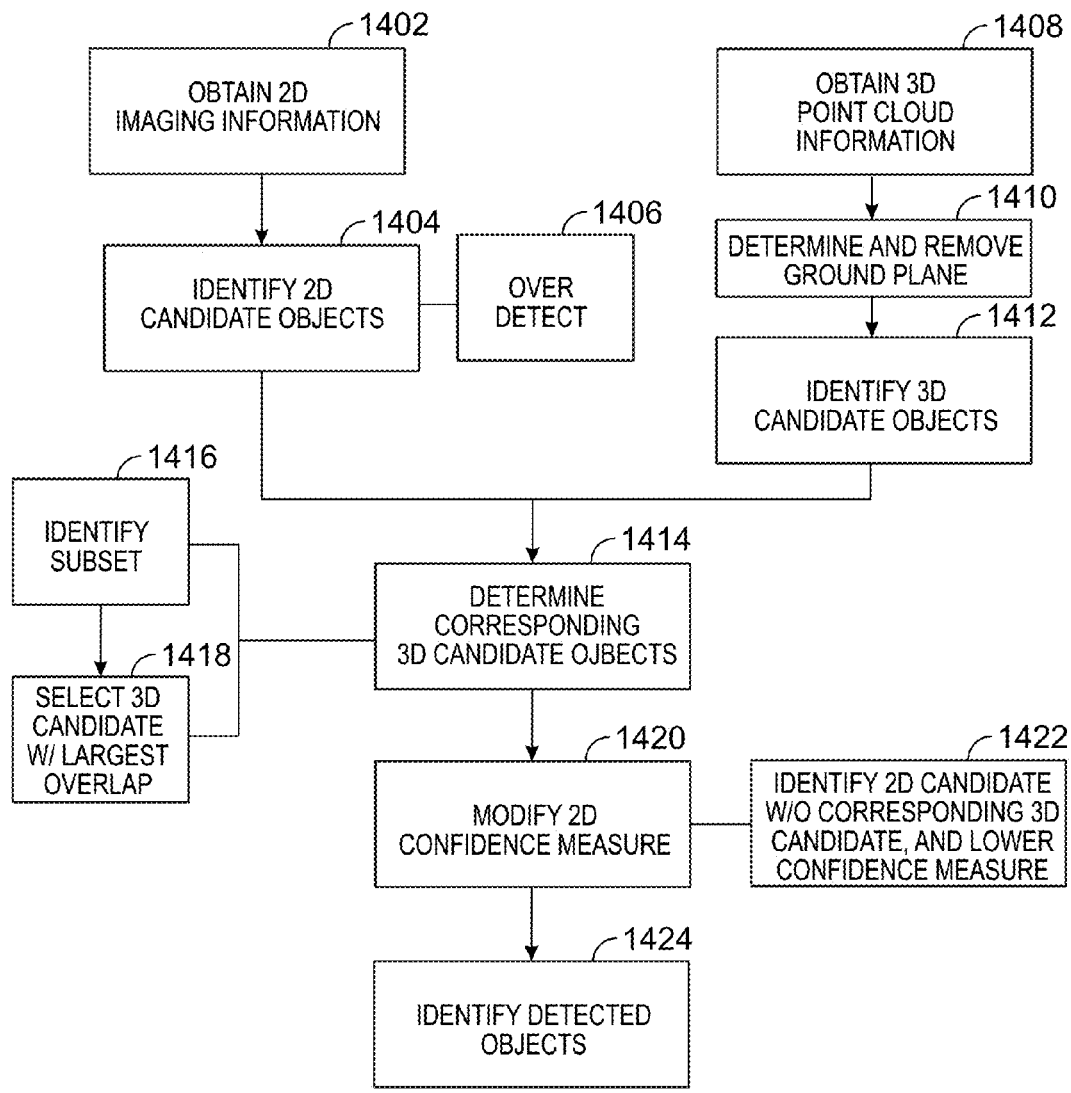
FIG. 14 is a flowchart of a method in accordance with an embodiment.

FIG. 14 illustrates a flowchart of a method 1400 for detecting an object or objects in accordance with various embodiments. The method 1400 may be performed, for example, using certain components, equipment, structures, steps, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At 1402, 2D imaging information of a target zone is obtained. For example, the 2D imaging information may be acquired via a camera, such as an EO camera that is located near the target zone, and includes the target zone within a field of view of the camera.

At 1404, 2D candidate objects are identified. For example, a set of 2D candidate objects may be identified from the 2D imaging information obtained at 1402, with each 2D candidate object having a corresponding 2D confidence measure associated therewith. The confidence measure for a given candidate object may represent a likelihood that the given candidate object in the imaging information represents a target object, such as a car. The 2D candidate objects may be identified as bounding boxes determined using a DPM technique. The model used to identify the candidate objects may be trained or developed using datasets having known target objects located therein.

As part of identifying 2D candidate objects, 2D candidate objects may be over detected at 1406. Generally, over detection may be understood as identifying or retaining a number of 2D candidate objects that may not satisfy a conventional criterion for eliminating false positives. For example, over detection may include identifying or retaining a number of objects as 2D candidate objects that is greater than a number of expected target objects in the target zone or within the field of view of the imaging device used to acquire the 2D imaging information. For example, in various embodiments, twice as many 2D candidate objects as expected objects may be identified and/or retained, five times as many 2D candidate objects as expected objects may be identified and/or retained, or ten times as many 2D candidate objects as expected objects may be identified and/or retained, among others. Additionally or alternatively, a threshold confidence measure for candidate object identification may be employed as part of over detection. For example, in various embodiments, 2D candidate objects may be identified or retained that have a confidence measure less than 50%, less than 20%, or less than 10%, among others. In some embodiments, all initially identified 2D candidate objects, regardless of confidence measure, may be retained as part of over detection. The ratio or amount of over detection may be varied in different embodiments, for example, depending on available processing capability and/or detection objectives.

At 1408, 3D point cloud information of the target zone is obtained. The point cloud information is an example of 3D imaging information. The 3D imaging information may be acquired at or nearly at the same time as the 2D information acquired at 1402 for improved agreement or correspondence between the 2D and 3D imaging information, to help prevent inaccuracy caused by movement of potential target objects. The 3D imaging information may be acquired, for example, with a Lidar device, with the Lidar device registered with a device (e.g., camera) used to acquire the 2D imaging information, such that locations within a frame of the 2D information may be reliably correlated with locations within a frame of the 3D information.

At 1410, a ground plane in the 3D point cloud information is determined and removed. Modified 3D information may be generated by removing the ground plane from the acquired or obtained 3D information. For example, a ground surface upon which other object entities such as cars, buildings, or pedestrians is disposed may be identified and removed. The ground plane or ground surface may be identified by fitting a number of plane models to the point cloud and selecting a model having the maximum number of points.

At 1412, 3D candidate objects are identified. For example, a set of 3D candidate objects may be identified from the modified 3D imaging information generated at 1410, with each 3D candidate object having a corresponding 3D confidence measure associated therewith. The confidence measure for a given candidate object may represent a likelihood that the given candidate object in the imaging information represents a target object, such as a car. The 3D candidate objects may be identified as blobs using a clustering technique. The clustering technique may include, for example, clustering points of the modified 3D information into blobs, extracting morphological features of the blobs, and classifying the blobs against a set of known models using the morphological features. Models used to identify the candidate objects may be trained or developed using datasets having known target objects located therein.

At 1414, 3D candidate objects that correspond to 2D candidate objects are identified. For example, for each of at least some of the 2D candidate objects, a corresponding 3D candidate object may be determined or identified from the 3D candidate objects. The correspondence may be determined based on an amount of overlap between 2D projections of 3D candidate objects (e.g., blobs) and 2D candidate objects (e.g., bounding boxes). In some embodiments, at 1416, a sub-set of the 3D candidate objects that may be projected on to a 2-dimensional bounding area corresponding to one of the 2D candidate objects is identified. For example, an overlap of about 10% may be required for a projection to be understood as overlapping with a 2D candidate object. At 1418, the 3D candidate from the sub-set having a projection with the largest amount of overlap with the 2D bounding area is selected as the corresponding 3D candidate for the 2D candidate. 2D candidate objects for which no projection has an overlap (or has an overlap below a minimum threshold, such as 10%), are determined to have no corresponding 3D candidate object.

At 1420, the 2D confidence measure for each 2D candidate object is modified to obtain a fused confidence measure based on both the 2D imaging information and 3D imaging information. For example, the 2D confidence measure for one or more 2D candidate objects may be modified based on whether the 2D candidate object corresponds to a 3D candidate object. For instance, if the 2D candidate object corresponds to a 3D candidate object, the fused confidence measure may represent a combination (e.g., a weighted combination) of the 2D confidence measure of the 2D candidate object and the 3D confidence measure of the corresponding 3D candidate object. The fused confidence measure, in some embodiments, may be provided by the following relationship: $C_{fusion} = C_{DPM} W * C_{morph}$, where W is a fixed parameter. For any 2D candidates identified at 1422 as not having a corresponding 3D candidate (e.g., no projection of a 3D candidate overlaps the 2D candidate, or no projection sufficiently overlaps the 2D candidate to satisfy a threshold), the 2D confidence measure is lowered, or penalized. For example, the 2D confidence measure may be penalized by subtracting a value from the 2D confidence measure, or, as another example, by dividing the 2D confidence measure by a number greater than 1. In some embodiments, the 2D confidence measure for a 2D candidate without an identified corresponding 3D candidate may be modified to provide a fused confidence measure using the following relationship: $C_{fusion} = C_{DPM} - \alpha$, where $\alpha$ is an experimentally determined parameter.

At 1424, detected objects are identified based on the fused confidence measures. For example, from the set of 2D candidate objects, a sub-set of one or more detected objects may be selected. One or more 2D candidate objects having a relatively higher fused confidence measure may be selected as detected objects, while one or more 2D candidate objects having a relatively lower fused confidence measure may be discarded or disregarded and not identified as detected objects. By over detecting 2D candidate objects, the occurrence of non-identified true target objects may be reduced, while using 3D information to modify the confidence measures helps to reduce or eliminate any false positives present in the 2D candidate object set from being selected as part of the sub-set of detected objects.

As discussed herein, systems and/or methods are disclosed that provide reliable detection of objects in a target zone, while eliminating or reducing false positives. Various embodiments provide for improved precision-recall curves for target detection relative to conventional approaches.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as a floppy disk drive, optical disk drive, and the like. The storage device may also be other similar means for loading computer programs or other instructions into the computer or processor.

As used herein, the terms "system," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for detecting one or more target objects, the method comprising:

obtaining 2-dimensional imaging information of a target zone;

obtaining 3-dimensional point cloud information of the target zone;

determining a ground plane in the 3-dimensional point cloud information and removing the ground plane to generate modified 3-dimensional information;

identifying a set of 2-dimensional candidate objects from the 2-dimensional imaging information, each 2-dimensional candidate object having associated therewith a corresponding 2-dimensional confidence measure;

identifying a set of 3-dimensional candidate objects from the modified 3-dimensional information by clustering proximal points from the modified 3-dimensional information into object groups, each 3-dimensional candidate object having associated therewith a corresponding 3-dimensional confidence measure;

determining, for each of at least some of the 2-dimensional candidate objects, a corresponding 3-dimensional candidate object from the set of 3-dimensional candidate objects; and modifying the 2-dimensional confidence measure for each of the at least some of the 2-dimensional candidate objects based on whether the 2-dimensional candidate object corresponds to a 3-dimensional candidate object, to generate fused confidence measures using the 2-dimensional confidence measures for each of the at least some of the 2-dimensional candidate objects and the 3-dimensional confidence measures of the determined corresponding 3-dimensional candidate objects, whereby the fused confidence measure filters out false objects from the 2-dimensional candidate objects to identify with a high degree of confidence a set of target objects.

2. The method of claim 1, further comprising identifying at least one 2-dimensional candidate object that does not have a corresponding 3-dimensional candidate object, and generating a fused confidence measure for the at least one 2-dimensional candidate object by lowering the corresponding 2-dimensional confidence measure by a predetermined amount.

3. The method of claim 1, wherein identifying the set of 2-dimensional candidate objects comprises over-detecting objects to be included in the set of 2-dimensional candidate objects, wherein over-detecting comprises including objects having a confidence measure that does not satisfy a threshold configured to prevent false positives from being included in the set of 2-dimensional candidates.

4. The method of claim 3, wherein more candidate objects are included in the set of 2-dimensional candidate objects than an expected number of candidate objects.

5. The method of claim 1, wherein generating the fused confidence measures comprises determining the fused confidence measures using $C_{fused} = C_{2d} + a*C_{3d}$, where $C_{fused}$ is the fused confidence measure for a particular 2-dimensional candidate object, $C_{2d}$ is the 2-dimensional confidence measure for the particular 2-dimensional candidate object, $C_{3d}$ is the 3-dimensional confidence measure for the corresponding 3-dimensional candidate object for the particular 2-dimensional candidate object, and a is a predetermined constant.

6. The method of claim 5, where a is less than 1.

7. The method of claim 1, where determining, for each of at least some of the 2-dimensional candidate objects, a corresponding 3-dimensional candidate object from the set of 3-dimensional candidate objects comprises:
  identifying a sub-set of the set of 3-dimensional candidate objects that may be projected on to a 2-dimensional bounding area corresponding to one of the 2-dimensional candidate objects; and
  selecting, as the corresponding 3-dimensional candidate object for the one of the 2-dimensional candidate objects, a 3-dimensional candidate object from the sub-set having a projection with the largest amount of overlap with the 2-dimensional bounding area.

8. The method of claim 1, further comprising training at least one model for performing at least one of the identifying the set of 2-dimensional candidate objects or identifying the set of 3-dimensional candidate objects.

9. The method of claim 1, wherein the identifying the set of 2-dimensional candidate objects comprises utilizing a deformable part-based model (DPM) to identify the set of 2-dimensional candidate objects.

10. The method of claim 1, wherein the identifying the set of 3-dimensional candidate objects comprises:
  clustering points of the modified 3-dimensional information into blobs;
  extracting morphological features of the blobs; and
  classifying the blobs against a set of known models using the morphological features.

11. A tangible and non-transitory computer readable medium comprising one or more computer software modules including instructions therein configured to direct one or more processors to:
  obtain 2-dimensional imaging information of a target zone;
  obtain 3-dimensional point cloud information of the target zone;
  determine a ground plane in the 3-dimensional point cloud information and remove the ground plane to generate modified 3-dimensional information;
  identify a set of 2-dimensional candidate objects from the 2-dimensional imaging information, each 2-dimensional candidate object having associated therewith a corresponding 2-dimensional confidence measure;
  identify a set of 3-dimensional candidate objects from the modified 3-dimensional information by clustering proximal points from the point cloud information into object groups, each 3-dimensional candidate object having associated therewith a corresponding 3-dimensional confidence measure;
  determine, for each of at least some of the 2-dimensional candidate objects, a corresponding 3-dimensional candidate object from the set of 3-dimensional candidate objects; and
  modify the 2-dimensional confidence measure for each of the at least some of the 2-dimensional candidate objects based on whether the 2-dimensional candidate object corresponds to a 3-dimensional candidate object, to generate fused confidence measures using the 2-dimensional confidence measures for each of the at least some of the 2-dimensional candidate objects and the 3-dimensional confidence measures of the determined corresponding 3-dimensional candidate objects, whereby the fused confidence measure filters out false objects from the 2-dimensional candidate objects to identify with a high degree of confidence a set of target objects.

12. The tangible and non-transitory computer readable medium of claim 11, wherein the computer readable medium is further configured to direct the one or more processors to:
  identify at least one 2-dimensional candidate object that does not have a corresponding 3-dimensional candidate object; and
  generate a fused confidence measure for the at least one 2-dimensional candidate object by lowering the corresponding 2-dimensional confidence measure by a predetermined amount.

13. The tangible and non-transitory computer readable medium of claim 11, wherein the computer readable medium is further configured to direct the one or more processors to over-detect objects to be included in the set of 2-dimensional candidate objects, wherein over-detecting comprises including objects having a confidence measure that does not satisfy a threshold configured to prevent false positives from being included in the set of 2-dimensional candidates.

14. The tangible and non-transitory computer readable medium of claim 13, wherein more candidate objects are included in the set of 2-dimensional candidate objects than an expected number of candidate objects.

15. The tangible and non-transitory computer readable medium of claim 11, wherein the computer readable medium is further configured to direct the one or more processors to:
  identify a sub-set of the set of 3-dimensional candidate objects that may be projected on to a 2-dimensional bounding area corresponding to one of the 2-dimensional candidate objects; and
  select, as the corresponding 3-dimensional candidate object for the one of the 2-dimensional candidate objects, a 3-dimensional candidate object from the sub-set having a projection with the largest amount of overlap with the 2-dimensional bounding area.

16. A system comprising:
  a first imaging device configured to acquire 2-dimensional imaging information of a target zone;
  a second imaging device configured to acquire 3-dimensional point cloud information of the target zone; and
  a processing unit operably coupled to the first imaging device and the second imaging device and including software modules having instructions therein which when executed by the processing unit are configured to obtain the 2-dimensional imaging information and the 3-dimensional point cloud information, the processing unit configured to:
  determine a ground plane in the 3-dimensional point cloud information and remove the ground plane to generate modified 3-dimensional information;
  identify a set of 2-dimensional candidate objects from the 2-dimensional imaging information, each 2-dimensional candidate object having associated therewith a corresponding 2-dimensional confidence measure;
  identify a set of 3-dimensional candidate objects from the modified 3-dimensional information by clustering proximal points from the modified 3-dimensional information into object groups, each 3-dimensional candidate object having associated therewith a corresponding 3-dimensional confidence measure;
  determine, for each of at least some of the 2-dimensional candidate objects, a corresponding 3-dimensional candidate object from the set of 3-dimensional candidate objects; and
  modify the 2-dimensional confidence measure for each of the at least some of the 2-dimensional candidate objects based on whether the 2-dimensional candidate object corresponds to a 3-dimensional candidate object, to generate fused confidence measures using the 2-dimensional confidence measures for each of the at least some of the 2-dimensional candidate objects and the 3-dimensional confidence measures of the determined corresponding 3-dimensional candidate objects, whereby the fused confidence measure filters out false objects from the 2-dimensional candidate objects to identify with a high degree of confidence a set of target objects.

17. The system of claim 16, wherein the first imaging device is an electro-optic (EO) camera.

18. The system of claim 16, wherein the second imaging device is a light radar (lidar) device.

19. The system of claim 16, wherein the processor unit is configured to over-detect objects to be included in the set of 2-dimensional candidate objects, wherein over-detecting comprises including objects having a confidence measure that does not satisfy a threshold configured to prevent false positives from being included in the set of 2-dimensional candidates.

20. The system of claim 19, wherein more candidate objects are included in the set of 2-dimensional candidate objects than an expected number of candidate objects.

* * * * *